(12) United States Patent
Siebald

(10) Patent No.: US 10,224,772 B2
(45) Date of Patent: Mar. 5, 2019

(54) ROTOR OF AN ELECTRIC MOTOR AND METHOD FOR PRODUCING THE ROTOR

(71) Applicant: CONTINENTAL AUTOMOTIVE GMBH, Hannover (DE)

(72) Inventor: Kurt Siebald, Rotenburg (DE)

(73) Assignee: Continental Automotive GmbH, Hannover (DE)

(*) Notice: Subject to any disclaimer, the term of this patent is extended or adjusted under 35 U.S.C. 154(b) by 183 days.

(21) Appl. No.: 14/443,868

(22) PCT Filed: Nov. 18, 2013

(86) PCT No.: PCT/EP2013/074024
§ 371 (c)(1),
(2) Date: May 19, 2015

(87) PCT Pub. No.: WO2014/079794
PCT Pub. Date: May 30, 2014

(65) Prior Publication Data
US 2015/0303752 A1 Oct. 22, 2015

(30) Foreign Application Priority Data
Nov. 23, 2012 (DE) .......... 10 2012 221 422

(51) Int. Cl.
*H02K 1/28* (2006.01)
*H02K 15/03* (2006.01)
(Continued)

(52) U.S. Cl.
CPC ............ *H02K 1/28* (2013.01); *H02K 1/278* (2013.01); *H02K 15/03* (2013.01); *H02K 15/10* (2013.01); *H02K 15/12* (2013.01)

(58) Field of Classification Search
CPC ............ H02K 1/278; H02K 1/28; H02K 1/30; H02K 1/27; H02K 15/03; H02K 15/10;
(Continued)

(56) References Cited

U.S. PATENT DOCUMENTS 4,954,736 A * 9/1990 Kawamoto ............ H02K 1/278
310/156.21
5,170,085 A 12/1992 Shinto
(Continued)

FOREIGN PATENT DOCUMENTS

CN 105792570 11/2012
DE 10 2008 012 628 4/2009
(Continued)

OTHER PUBLICATIONS

Office Action dated Oct. 26, 2016 which issued in the corresponding Chinese Patent Application No. 201380060321.4.

*Primary Examiner* — Burton S Mullins
(74) *Attorney, Agent, or Firm* — Cozen O'Connor

(57) ABSTRACT

A rotor of an electric motor includes a laminated armature core, a shaft, magnets arranged on the circumference of the laminated armature core, and a plastic overmold. The laminated armature core has at least one associated channel on the circumference of the laminated armature core for each magnet. The channels extend parallel to the shaft, and the laminated armature core has radially oriented webs on the circumference. The webs (8) extend parallel to the shaft and a magnet (9) is arranged between each pair of webs (8), and the plastic overmold (4) encloses the laminated armature core (1) and the magnets (3) to such an extent that only the radial outer face of the magnets (3) is free of plastic (4).

10 Claims, 3 Drawing Sheets

(51) Int. Cl.
*H02K 1/27* (2006.01)
*H02K 15/10* (2006.01)
*H02K 15/12* (2006.01)

(58) Field of Classification Search
CPC ........ H02K 15/12; H02K 53/00; H02K 7/116;
H02K 25/00; H02K 35/02; B64D 27/24
USPC .................................... 310/43, 156.23, 68 B
See application file for complete search history.

(56) References Cited

U.S. PATENT DOCUMENTS

| | | | | |
|---|---|---|---|---|
| 5,939,809 A * | 8/1999 | Mobius | ................... | H02K 1/278 |
| | | | | 310/156.13 |
| 6,078,121 A * | 6/2000 | Poag | ..................... | H02K 1/278 |
| | | | | 29/596 |
| 6,489,696 B2 * | 12/2002 | Sashino | ............... | H02K 1/2733 |
| | | | | 310/156.01 |
| 6,712,585 B2 * | 3/2004 | Iehl | ........................ | F04C 14/08 |
| | | | | 310/156.05 |
| 7,612,478 B2 * | 11/2009 | Marioni | ................. | H02K 1/278 |
| | | | | 310/156.23 |
| 9,130,426 B2 * | 9/2015 | Song | ....................... | H02K 1/278 |
| 2008/0185930 A1 * | 8/2008 | Ahrens | .................. | H02K 1/278 |
| | | | | 310/156.08 |
| 2009/0251023 A1 | 10/2009 | Nakano et al. | | |
| 2012/0313463 A1 * | 12/2012 | Howell | .................. | H02K 15/03 |
| | | | | 310/43 |
| 2013/0026862 A1 * | 1/2013 | Brandau | ................ | H02K 1/278 |
| | | | | 310/43 |
| 2013/0106207 A1 * | 5/2013 | Song | ....................... | H02K 1/278 |
| | | | | 310/43 |

FOREIGN PATENT DOCUMENTS

| | | | | |
|---|---|---|---|---|
| DE | 102008034422 A1 * | 2/2010 | ............... | H02K 1/27 |
| EP | 0 459 355 A1 | 5/1991 | | |
| GB | 2 217 924 A | 11/1989 | | |
| JP | 04-109837 | 4/1992 | | |

* cited by examiner

ROTOR OF AN ELECTRIC MOTOR AND METHOD FOR PRODUCING THE ROTOR

CROSS-REFERENCE TO RELATED APPLICATIONS

This is a U.S. national stage of application No. PCT/EP2013/074024, filed on 18 Nov. 2013, which claims priority to the German Application No. DE 10 2012 221 422.4 filed 23 Nov. 2012, the content of both incorporated herein by reference.

BACKGROUND OF THE INVENTION

1. Field of the Invention

The invention relates to a rotor of an electric motor, comprising a laminated armature core, a shaft, magnets arranged on the circumference of the laminated armature core, and a plastic overmold. The invention also relates to a method for producing the rotor.

2. Related Art

Electric motor rotors of this type are used, for example, in fuel pumps or actuating elements. In order to achieve a high degree of efficacy of the electric motors, the magnetic flux must be as high as possible. This presupposes that the magnets are arranged exactly in their predefined position on the rotor and cooperate as optimally as possible with the stator of the electric motor. The magnets are fixed in their position by the plastic overmold. For the plastic overmolding the laminated armature core is inserted with the shaft and the magnets into an injection mold. This means that the magnets have to be brought already into the correct end position prior to the overmolding in the injection mold. To this end, it is known to fix the magnets to the rotor by an adhesive. This fixing by an adhesive signifies an additional process step, which has a detrimental effect on productivity.

SUMMARY OF THE INVENTION

An object of the present invention is therefore to create a rotor of an electric motor and method for producing such a rotor, such that the rotor is easier to produce. In particular, the use of adhesive is to be avoided.

This object may be achieved with a rotor in which the laminated armature core has, on the circumference thereof, at least one associated channel for each magnet, wherein the channels run parallel to the shaft, and the laminated armature core has radially oriented webs on the circumference, wherein the webs extend parallel to the shaft and a magnet is arranged between each pair of webs, and the plastic overmold encloses the laminated armature core and the magnets to such an extent that only the radial outer face of the magnets is free of plastic.

The arrangement of the channels and of the webs means that the magnets can be positioned in a defined manner both in the radial direction and with regard to their distribution on the circumference. The distribution of the magnets on the circumference can be predefined in an exact manner by the webs. Due to the channels open to the magnets, the injected plastic presses against the magnets via these openings on account of the injection pressure of the plastic, and presses these magnets against the injection mold. In this way the magnets are moved in the radial direction into their end position. This has the advantage that the end position of the magnets is determined alone by the injection mold. Manufacturing tolerances of the laminated armature core and positional tolerances in the injection mold are thus evened out. The laminated armature core can thus be fabricated with greater tolerances and therefore more economically. In addition, there is no need to fix the magnets.

Depending on the size of the magnets, it may be expedient in the case of larger magnets to provide each magnet with at least 2 channels in the laminated armature core.

In accordance with further advantageous embodiments, the channels have a round, triangular or polygonal cross-sectional area.

A particularly close connection of the plastic overmolding with the laminated armature core is achieved when the cross-sectional area of the channels produces an undercut with respect to the opening provided for the magnet. An interlocking connection is thus additionally produced between the laminated armature core and plastic overmolding.

The magnets are held on the rotor by the adhesive bond between plastic and magnet. The hold of the magnets on the rotor can be increased in accordance with an advantageous embodiment in that, when the magnets are additionally connected in an interlocked manner to the plastic overmold, at least the radially outer edges of the magnets have chamfers and the chamfers are surrounded by plastic. The advantage lies in that the interlocked connection is produced merely by the plastic and the magnets and not between the magnets and the laminated armature core, which would increase the outlay for the laminated armature core.

A reliable distribution of the magnets on the circumference without significantly increasing the weight of the laminated armature core is achieved in another embodiment in that the webs are shorter than the magnets. In this way the distribution is ensured without significantly enlarging the diameter of the armature cores. This in turn means that the costs for these stamped parts hardly increase.

This is achieved in accordance with the invention in that the plastic penetrates the channels in the laminated armature core at the end face and presses the magnets in the radial direction against the injection mold.

The advantage lies in that the end position of the magnets in the rotor is no longer achieved exclusively by the design of the rotor and/or the injection mold. In accordance with this method the process-induced pressure with which the plastic is injected into the injection mold is utilized in order to move the magnets into the end position thereof, which is determined by the injection mold. The webs in the laminated armature core are used here for guidance when the magnets move radially outwardly. The magnets thus are positioned only during the actual injection molding and not already during the insertion into the injection mold. Only the cooperation of workpiece, tool and process leads to the final positioning.

BRIEF DESCRIPTION OF THE DRAWINGS

The invention will be described in greater detail on the basis of an exemplary embodiment. In the drawings.

DETAILED DESCRIPTION OF THE PRESENTLY PREFERRED EMBODIMENTS

Figure 1:
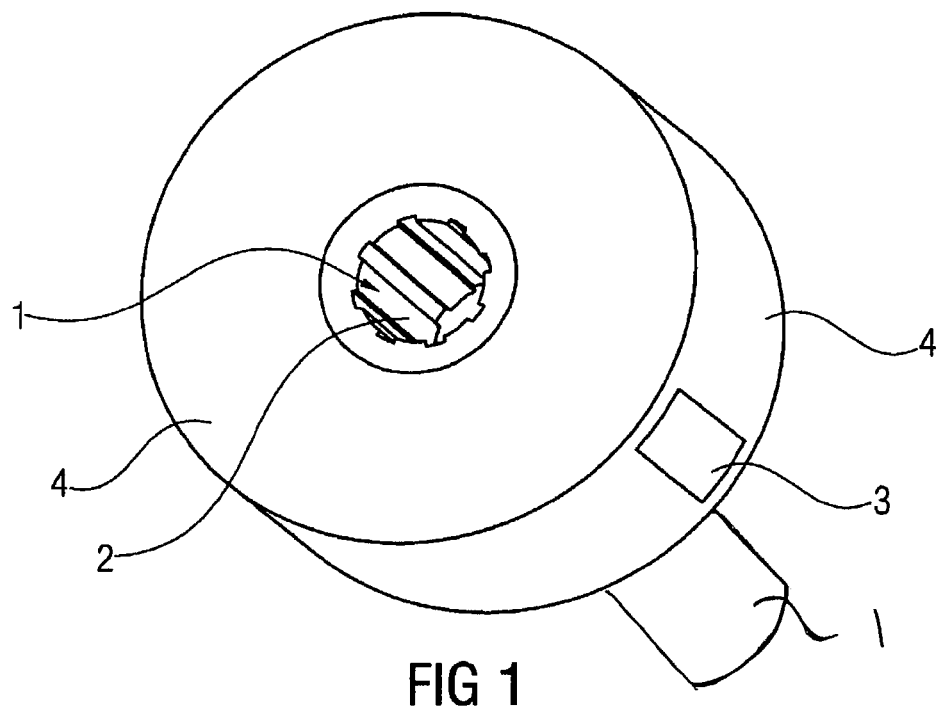
FIG. 1 shows a rotor according to the invention.

FIG. 1 shows a rotor of an electric motor used in a fuel pump or an actuating element. A laminated armature core 1 sits on the shaft 1' of the rotor and consists of a plurality of stamped metal sheets 2, which are connected to form the laminated armature core 1. Magnets 3 are distributed around the outer lateral surface of the laminated armature core 1. The laminated armature core 1 and magnets 3 are overmolded with plastic 4 and together, as a homogeneous body, form the rotor. The magnets can be hard ferrite magnets or neodymium magnets.

Figure 2A:
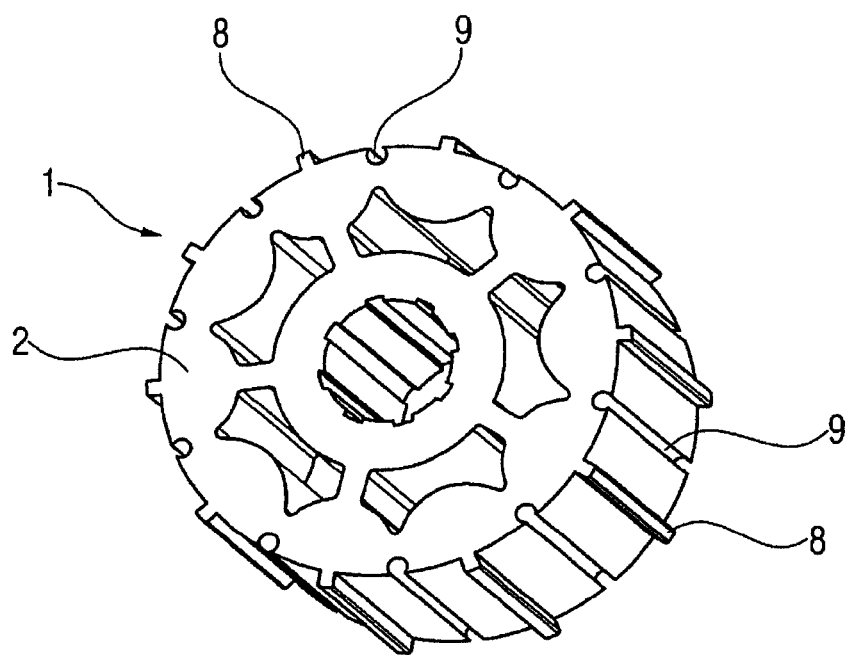
FIGS. 2a and b show the laminated armature core and magnets in an exploded illustration.
Figure 2B:
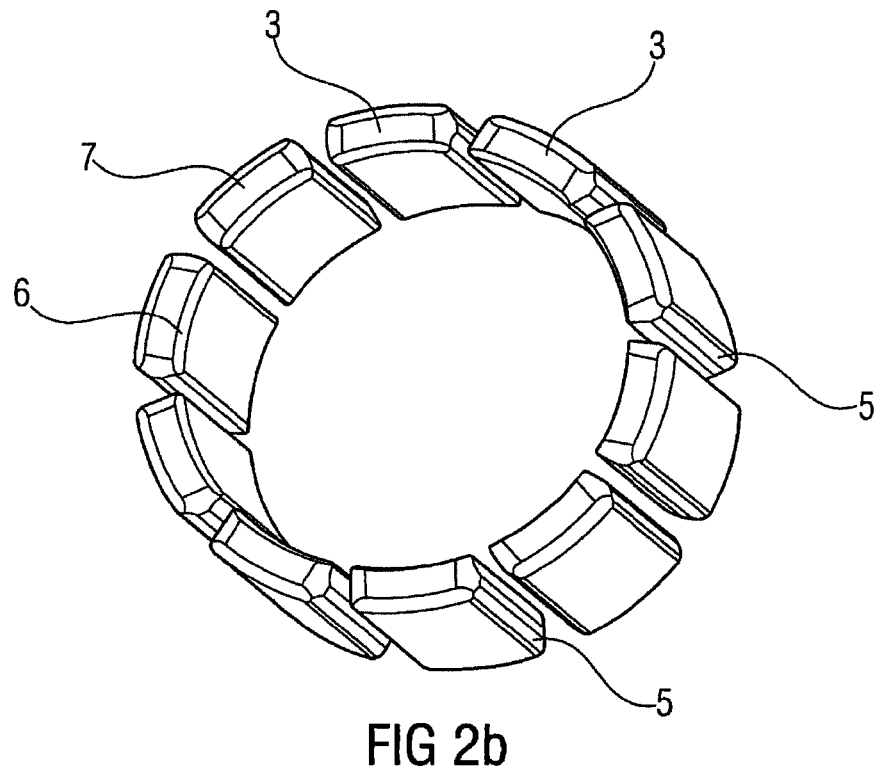
FIG. 2c shows the laminated armature core and magnets in the joined state.
Figure 2C:
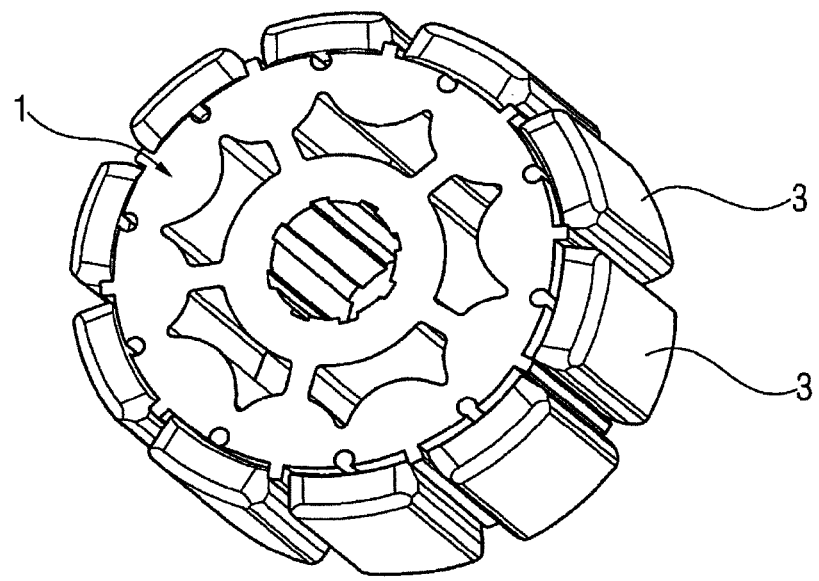
Figure 3:
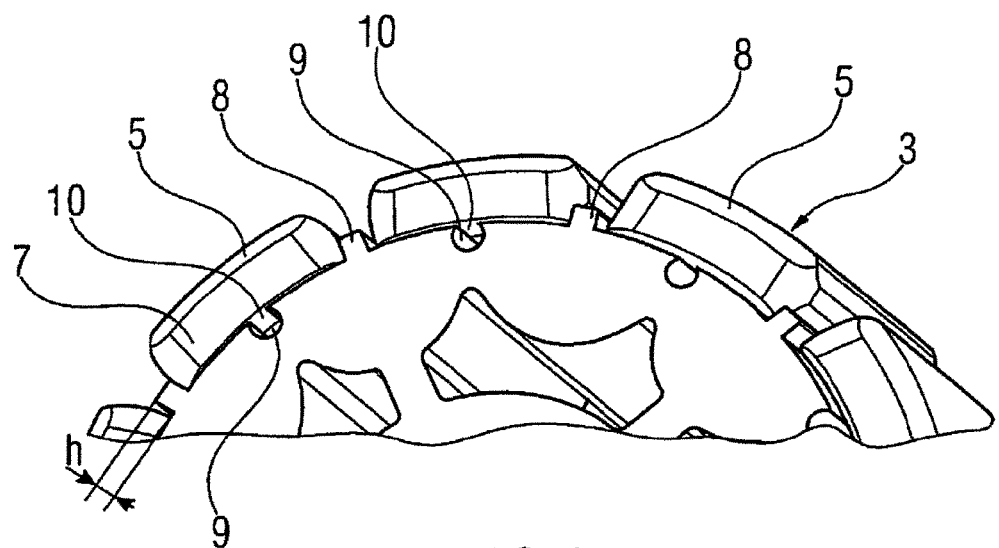
FIG. 3 shows a channel of the laminated armature core in an enlarged illustration.

FIG. 2a shows the laminated armature core 1, consisting of the stamped metal sheets 2 and the magnets 3 in an exploded illustration. The magnets 3 as illustrated in FIGS. 2b and 2c and 3, have, at their radially outer edges 5 and the radially inner edges 6 of the end faces 7, chamfers 10, which ensure an interlocked bond between magnet 3 and plastic 4 during the overmolding with the plastic 4. The plastic 4 may be polyoxymethylene or polyamide. The laminated armature core 1 has, on the outer lateral surface, radially outwardly protruding webs 8, which fix the magnets 3 on the laminated armature core 1 in the circumferential direction. A channel 9 is arranged between each pair of webs 8. Both the channels 9 and the webs 8 are oriented parallel to the shaft of the rotor.

FIG. 2a shows the magnets 3, radially outer edges 5 and radially inner edges 6 and faces 7 of the magnets 3. FIG. 2b shows the laminated armature core 1 and the magnets 3, as these are arranged in the injection mold.

FIG. 3 shows a channel 9 in an enlarged illustration. The channel 9 has, over the longitudinal extent thereof, an opening 10 directed toward the magnet 3. The width of the opening 10 is smaller than the diameter of the cross-sectional area of the channel 9. During the injection molding, the plastic 4 is injected into the channel 9. As a result of this back injection of the magnet 3 with the pressure of the plastic melt prevailing during this process, the magnet 3 is pressed radially outwardly against the wall of the injection mold into the end position of the magnet. This movement is clearly smaller than the height h of the webs 8. The magnet 3 is fixed in its end position with the cooling and curing of the plastic melt 4.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a rotor having a laminated armature core (1) configured to accommodate a shaft (1') along a longitudinal axis of the rotor, a plurality of magnets (3) arranged on a circumference of the laminated armature core, each of the plurality of magnets having a radial height; and a plastic overmold (4), wherein the laminated armature core (1) has: for each magnet (3), at least one associated channel (9) on the circumference of the laminated armature core (1), the channels (9) running parallel to the longitudinal axis, and radially oriented webs (8) on the circumference, an entirety of each of the webs (8) extending parallel to the longitudinal axis of the rotor, the radially oriented webs (8) having a radial extension less than the radial height of the plurality of magnets, the method comprising:
   mounting the laminated armature core on the shaft;
   inserting the laminated armature core with the shaft and the magnets into an injection mold wherein one of the plurality of magnets (3) is arranged between each pair of webs (8); and
   overmolding the laminated armature core with the shaft and the magnets with plastic wherein the plastic overmold (4) encloses the laminated armature core (1),
   wherein the plastic penetrates the channels in the laminated armature core and presses the magnets against the injection mold in the radial direction to force the plurality of magnets away from a circumference of the laminated armature core (1) a distance so that the plastic overmold is arranged between the laminated armature core and a radially inner surface of each of the plurality of magnets, wherein only the radially outer face of the magnets (3) is free of the plastic overmold (4),
   wherein the magnets (3) are arranged on the circumference of the laminated armature core (1) and are spaced apart from each other by radially oriented webs (8) on the circumference of the laminated armature core (1), an entirety of each of the radially oriented webs (8) extending parallel to a longitudinal axis of the rotor,
   wherein the distance is less than a height of the radially oriented webs (8),
   wherein an entirety of each of the radially oriented webs (8) have substantially rectangular cross sections.

2. The method for producing a rotor as claimed in claim 1, wherein a distribution of the magnets (3) on the circumference is predefined by the webs (8).

3. The method for producing a rotor as claimed in claim 1, wherein each of the plurality of magnets move radially outwardly into their respective end positions during the overmolding.

4. The method for producing a rotor as claimed in claim 1,
   wherein each of each of the plurality of magnets (3) has respective axial end faces,
   wherein each of the a plurality of magnets (3) comprises a circumferential chamfer arranged on each axial radially outer edge of each axial end face,
   wherein the plastic overmold is arranged on at least a portion of the circumferential chamfer on each axial radially outer edge of each end face.

5. A rotor of an electric motor, comprising:
   a laminated armature core (1) configured to accommodate a shaft (1') along a longitudinal axis of the rotor;
   a plurality of magnets (3) arranged on a circumference of the laminated armature core, each of the plurality of magnets having a radial height; and
   a plastic overmold (4),
   wherein the laminated armature core (1) has:
      for each magnet (3), at least one associated channel (9) on the circumference of the laminated armature core (1), the channels (9) running parallel to the longitudinal axis, and
      radially oriented webs (8) on the circumference, an entirety of each of the webs (8) extending parallel to the longitudinal axis of the rotor, the radially oriented webs (8) having a radial extension less than the radial height of the plurality of magnets, wherein one of the plurality of magnets (3) is arranged between each pair of webs (8), and wherein the plastic overmold (4) encloses the laminated armature core (1) and the magnets (3) to such an extent that the channels are filled to force the plurality of magnets away from the circumference of the laminated armature core (1) a distance so that the plastic overmold is arranged between the laminated armature core and a radially inner surface of each of the plurality of magnets, wherein only the radially outer face of the magnets (3) is free of the plastic overmold (4), wherein the distance is less than a height of the radially oriented webs (8), and wherein the entirety of each of the webs (8) extending parallel to the longitudinal axis of the rotor have substantially rectangular cross sections.

6. The rotor as claimed in claim 5, wherein the channels (9) have a round, triangular or polygonal cross-sectional area.

7. The rotor as claimed in claim 5, wherein each magnet has a radially inner edge (6) at which a circumferential chamfer (10) is provided, the chamfers (10) being surrounded by the plastic overmold (4).

8. The rotor as claimed in claim 5, wherein a distribution of the magnets (3) on the circumference is predefined by the webs (8).

9. The rotor as claimed in claim 5, wherein the radially oriented webs (8) are configured to guide the magnets radially outwardly into their respective end positions during an injection molding process.

10. The rotor as claimed in claim 5, wherein each of each of the plurality of magnets (3) has respective axial end faces, wherein each of the plurality of magnets (3) comprises a circumferential chamfer arranged on each axial radially outer edge of each axial end face, wherein the plastic overmold is overmolded on at least a portion of the circumferential chamfer on each axial radially outer edge of each end face.

* * * * *